(12) United States Patent
Schafer et al.

(10) Patent No.: US 10,870,411 B1
(45) Date of Patent: Dec. 22, 2020

(54) USING VEHICLE FOB LOCATION TO IMPROVE VEHICLE SYSTEMS

(71) Applicant: InterMotive, Inc., Auburn, CA (US)

(72) Inventors: Gregory E. Schafer, Incline Village, NV (US); Dan C. Mower, Grass Valley, CA (US); Ryan B. Ebuen, Rocklin, CA (US)

(73) Assignee: InterMotive, Inc., Auburn, CA (US)

( * ) Notice: Subject to any disclaimer, the term of this patent is extended or adjusted under 35 U.S.C. 154(b) by 0 days.

(21) Appl. No.: 16/546,069

(22) Filed: Aug. 20, 2019

Related U.S. Application Data

(63) Continuation-in-part of application No. 16/104,636, filed on Aug. 17, 2018.

(Continued)

(51) Int. Cl.
| | |
|---|---|
| *B60R 25/10* | (2013.01) |
| *B60R 25/06* | (2006.01) |
| *G07C 5/08* | (2006.01) |
| *B60R 25/24* | (2013.01) |
| *B60Q 1/14* | (2006.01) |
| *B60R 25/01* | (2013.01) |
| *B60R 25/30* | (2013.01) |
| *B60R 25/31* | (2013.01) |
| *H04N 5/232* | (2006.01) |
| *B60R 7/14* | (2006.01) |
| *G07C 9/28* | (2020.01) |

(52) U.S. Cl.
CPC ............ *B60R 25/06* (2013.01); *B60Q 1/1423* (2013.01); *B60R 7/14* (2013.01); *B60R 25/01* (2013.01); *B60R 25/24* (2013.01); *B60R 25/305* (2013.01); *B60R 25/31* (2013.01); *G07C 5/08* (2013.01); *G07C 9/28* (2020.01); *H04N 5/232* (2013.01); *B60R 2325/105* (2013.01)

(58) Field of Classification Search
CPC ........... B60R 25/06; B60R 7/14; B60R 25/01; B60R 25/24; B60R 25/305; B60R 25/31; G07C 9/28; G07C 5/08; B60Q 1/1423; H04N 5/232
See application file for complete search history.

(56) References Cited

U.S. PATENT DOCUMENTS

| | | | |
|---|---|---|---|
| 5,944,631 A | 8/1999 | Schafer | |
| 5,965,954 A * | 10/1999 | Johnson | ................ B60R 25/04 180/287 |

(Continued)

*Primary Examiner* — Phung Nguyen
(74) *Attorney, Agent, or Firm* — Heisler & Associates (57) ABSTRACT

A controller is integrated into a vehicle with the controller coupled to a fob detector and also coupled to a vehicle disabler and/or other vehicle subsystems. Examples of vehicle disablers include a brake transmission shift interlock (BTSI), a transmission shift interlock (TSI) and an air brake or electric parking brake of the vehicle. The fob detector can be provided along with the controller and separate from a mechanical key ignition of the vehicle, or can be a fob detector associated with a keyless ignition of the vehicle. A mobile fob is used as part of the system, carried on the person of an authorized driver of the vehicle. This fob can be provided separately along with the controller, or can be a fob associated with a keyless entry of the vehicle. The controller causes the vehicle disabler or other vehicle subsystems to adjust performance based on fob presence or absence.

14 Claims, 3 Drawing Sheets

Related U.S. Application Data

(60) Provisional application No. 62/720,717, filed on Aug. 21, 2018, provisional application No. 62/547,575, filed on Aug. 18, 2017.

(56) References Cited

U.S. PATENT DOCUMENTS

| | | | |
|---|---|---|---|
| 6,594,565 B1 | 7/2003 | Schafer | |
| 7,274,980 B1 * | 9/2007 | Schafer | B60P 1/4471 701/36 |
| 9,132,805 B1 * | 9/2015 | King | B60R 25/21 |
| 9,469,261 B1 | 10/2016 | Thomas | |
| 2014/0277973 A1 * | 9/2014 | Nedorezov | B60R 25/00 701/53 |
| 2016/0318438 A1 * | 11/2016 | Wadell | B60Q 1/2603 |

* cited by examiner

USING VEHICLE FOB LOCATION TO IMPROVE VEHICLE SYSTEMS

CROSS-REFERENCE TO RELATED APPLICATIONS

This application is a continuation-in-part of U.S. patent application Ser. No. 16/104,636 filed on Aug. 17, 2018, which claims benefit under Title 35, United States Code § 119(e) of U.S. Provisional Application No. 62/547,575 filed on Aug. 18, 2017. This application also claims benefit under Title 35, United States Code § 199(e) of U.S. Provisional Application No. 62/720,717 filed on Aug. 21, 2018.

FIELD OF THE INVENTION

The following invention relates to vehicle subsystems which control who may operate a vehicle and which prevent loss of the vehicle. More particularly, this invention is related to vehicle theft prevention systems, and particularly automobile and other road vehicle theft prevention systems, which use the brake transmission shift interlock (BTSI) element on the vehicle, or other vehicle disabler, to disable the vehicle when a fob carried by an authorized user is not present. This invention also relates to systems which use the fob carried by an authorized user to enable and/or disable various vehicle systems

BACKGROUND OF THE INVENTION

Emergency vehicles such as police, fire, work truck and ambulances are particularly vulnerable to theft, as they are frequently left unattended with the engine running, due to the nature of their use. Closing the windows and locking the doors is a small deterrent to thieves, only requiring breaking a window to steal the vehicle and all its equipment, or in the case of ambulances, controlled substances/medications.

The invention here described provides a fully automatic and passive way for these vehicles to be "locked down" or prevented from being driven when the authorized driver leaves the vehicle running but unattended. When the driver returns to the vehicle, the vehicle is automatically "unlocked," allowing the vehicle to be driven.

The driver does not have to activate the system or operate any controls. The only requirement is that he carry the vehicle's key fob on his/her person. For vehicles without an original equipment fob, an aftermarket fob can be used.

FMVSS and BTSI

The U.S. Federal Motor Vehicle Safety Standard (FMVSS) requires vehicles under 10,000 lbs GVWR to have a Brake Transmission Shift Interlock (BTSI) which requires the driver to press the Service Brake in order to shift the transmission out of "Park" (when the key or ignition is in the "Run" position/state). This BTSI lock mechanism locks the transmission in Park, such that it cannot be shifted out, thus "locking down" the vehicle until the Service Brake is pressed. The BTSI can be manipulated or controlled for other purposes to lock the vehicle in Park and prevent driving the vehicle, even if the Service Brake is pressed.

Dodge Charger Secure Park—Background Art

The police version of the DODGE CHARGER (a trademark brand of FCA US LLC) does not use a conventional key, but rather a wireless Radio Frequency (RF) key fob, and a stop/start button for turning the engine off/on. Getting in the vehicle and pressing the stop/start button will do nothing unless the vehicle senses the proximity of the fob. If the fob is present (and Service Brake pushed), pressing the stop/start button will start the vehicle. The vehicle has the ability to detect the proximity of the RF fob.

The police version of the DODGE CHARGER has a feature known by the trademark "SECURE PARK," in which the driver can push a steering wheel button with the engine running and transmission in Park. If the vehicle senses the presence of the fob, the vehicle will enter SECURE PARK mode, in which the BTSI is activated and the transmission cannot be shifted out of Park. The driver/officer can then leave the vehicle unattended and idling, and the locked BTSI will prevent the vehicle from being stolen or moved. The SECURE PARK system in the CHARGER requires the returning driver to again push the steering wheel button to release the BTSI. The vehicle must sense the presence of the key fob when the steering wheel button is pushed before it will exit SECURE PARK and release BTSI.

The CHARGER SECURE PARK system, while generally effective, is not automatic. In emergency situations (which are commonly encountered by emergency vehicles) emergent circumstances can often cause an operator to forget to push the button on the steering wheel, or make a conscious decision to use that time for addressing other threatening circumstances. The vehicle is thus left in a configuration vulnerable to theft. Furthermore, emergency personnel, although highly trained, benefit from having less (and not more) things to remember to do when handling emergency situations. While theft prevention is a high priority, it is often not the absolute highest priority in dangerous circumstances. A need exists for a fully automated and passive theft deterrent system and method which requires little or no training for emergency personnel, and provides theft prevention benefits.

Current RF vehicle key fobs come in two common implementations, passive or Near Field Communication (NFC) fobs, and active fobs. Near field communication passive fobs must be placed within close proximity to the fob reader, usually 10 cm or less. This is because they do not use a battery to allow RF transmission, but rely on near field changes to the fob readers transmissions for communication.

Active vehicle fobs use a battery to allow the fob to transmit RF signals over longer distances, such as a meter or more. In a typical vehicle application, the vehicle's fob reader sends out RF query transmissions, to which the active fob replies, thus confirming local proximity.

Active fob detection is already being used in vehicle applications to assist in unlocking doors when the driver approaches a locked vehicle, and also allows the use of Engine Start/Stop buttons to replace the traditional ignition key and switch.

There are other desirable functions possible by using active fob detection in the vocational vehicle upfitter market. Fob detection can be accomplished multiple ways. In one preferred embodiment, an aftermarket Electronic Control Unit (ECU), connected to the vehicle's CAN (Controller Area Network) network can query the vehicle and determine the status of the OEM fob presence. In this way, the OEM fob and fob reader are used, eliminating the need for aftermarket hardware to provide fob proximity detection. Another embodiment involves providing an aftermarket fob and fob reader to determine fob proximity.

There have been automotive accidents due to drivers exiting a vehicle with the engine running and transmission in drive. The vehicle then begins moving with no driver, causing property damage, personal injury, and even death in some instances.

In response, Fiat Chrysler Automobiles (FCA) has implemented a safety strategy such that opening the driver's door with the driver's seatbelt unbuckled, will cause the vehicle to automatically shift into Park, if the vehicle speed is sufficiently low (1.2 mph or less, as currently implemented). While such an "Auto Park" safety system works for most users, it creates problems in several situations. Many drivers need to move vehicles with the door open and no seatbelt fastened. Backing a truck up with a trailer is one scenario. Law Enforcement and other emergency responders, such as fire and ambulance drivers frequently need to move vehicles in emergency situations with the door open and no seatbelt fastened. FCA's "all vehicle" Auto Park solution creates problems for these users.

Adding active fob detection, according to this invention, can solve this problem, and is another example of using fob detection to improve vehicle function. If the fob is detected as being present in the vehicle, this can be interpreted to mean the driver is in the vehicle, and there is no need to auto shift the transmission into Park, as the driver may be trying to move the vehicle. This works best in the aftermarket sectors where operators are considered professional drivers and can be instructed to wear the fob on their person, and not leave it in the vehicle or purse. (Note that vehicles generally have no occupant seat sensor in the driver's seat position).

SUMMARY OF THE INVENTION

The current invention, in a first embodiment, involves the installation of an aftermarket control module in the vehicle, and requires the driver to wear or otherwise keep the fob with the driver, possibly in a duty belt. This system eliminates the need to push a button to lock or unlock BTSI, and eliminates the possibility of the driver forgetting to activate the system when leaving the vehicle with engine running. The system automatically locks the BTSI (or other vehicle disabler system) whenever the vehicle is parked with the engine running, when the fob leaves the vehicle. This improves on the prior art by not requiring the driver to remember to push any button to activate or release BTSI (or other lock system). When the driver leaves the vehicle, the fob is no longer sensed as being present in the vehicle and the system locks the vehicle down. When the driver returns, the "body worn" fob will be automatically be detected, and the BTSI (or other system) will be deactivated, allowing the vehicle to be driven.

The invention is typically implemented with an aftermarket ECU control module, the RF fob, the OEM vehicle RF transceiver that communicates with the fob, and a system (typically software running on the aftermarket ECU which communicates with the OEM RF transceiver) for detecting the fob and activating or locking the BTSI. An "aftermarket" control module is provided to perform this function.

Most modern vehicles which use a wireless Radio Frequency (RF) fob have the ability to detect the proximity of the fob and this information is frequently available over the vehicles Controller Area Network (CAN), although reading this proprietary information can be a challenge. Deciphering and detecting these messages can sometimes be done through a process of "reverse engineering" the vehicles network messages. In such cases, this flow of existing information can be utilized by the control module, or other programmable element in the CAN network to both read fob proximity information, and also control the BTSI (i.e. engage or disengage the BTSI) and implement the system of this invention.

Scope

This invention is useable on all vehicles which have some method of locking down or securing the vehicle. On chassis which have a BTSI, being able to manipulate the BTSI allows using it for this security feature. Vehicles without a BTSI frequently have air brakes, in which the air Park Brake can be activated and locked to prevent vehicle movement in an analogous manner. Another method of locking a vehicle in place could be an Electric Park Brake which could be activated and prevented from being released in an analogous manner to that in which the BTSI is controlled.

Securing the Weapons Rack and Trunk Release

Law enforcement and other government vehicles frequently have a weapons rack which secures one or more weapons such as a rifle. Usually there is a release button which must be pushed in order to release and remove the weapon for use. This button typically provides a timed period (e.g. 5-10 seconds during which a gun can be removed before it re-locks). Many emergency vehicles have a trunk or other storage area where they secure valuable or sensitive equipment. Such trunks/storage areas are typically also locked unless a release button is depressed.

The invention here described includes a disable output signal which can be used to disable the release button on the weapons rack, preventing unauthorized removal of weapons. This output can also be used to disable the vehicles trunk release button (or other compartment). This disable output goes active when the vehicle is placed in a lockdown mode, that is, when the driver and fob leaves the parked vehicle with engine running. The disable output can merely override signals from a weapons rack button or trunk/secure area release button.

Preferably, the disable output does not go immediately active when the fob leaves the vehicle, but rather has a configurable timer, such that the driver is given time to access the weapons rack or trunk after leaving the driver's seat. A key can also be used when the release buttons have been disabled, as a second alternative.

When the driver and fob returns to the vehicle, the disable output becomes non-active, which re-enables the weapons rack release button and the truck release. Thus, in this embodiment, the weapons rack and trunk are also secured when the driver leaves the vehicle. The system will naturally work for additional officers as long as they carry secondary fobs which are programmed to work with the vehicle.

Aftermarket Fob

All fobs have a unique ID which they communicate wirelessly to the receiving Electronic Control Unit ("ECU" or RF transceiver) in the vehicle (in the case of OEM (Original Equipment Manufacturer) fobs) or the control module (in the case of aftermarket fobs). On vehicles which do not come from the factory with an RF fob, one or more fobs can be provided which are "paired" to the aftermarket RF transceiver in the vehicle. The pairing allows the control module to identify authorized fobs. The RF fob can use any of several available wireless RF (or other transmission) technologies so its ID and presence can be detected by the RF transceiver. Active RFID would be one good choice that minimizes battery replacement frequency and provides appropriate range for the driver carrying the fob. Another choice could be Bluetooth Low Energy (BLE).

Fob Present Indicator Output

The control module provides an output signal which can be connected to an indicator such as an LED, to let the driver know the fob is detected as an authorized fob for this vehicle (or analogously that the fob is detected but not authorized or that no fob is detected), such as with different color LEDs.

To detect fob presence, in one embodiment, the vehicle based RF transceiver sends out an RF signal periodically (e.g. once every second). The fob will detect the RF signal "call" and return an RF signal "reply" that the RF transceiver detects. Presence of the fob is thus confirmed. If the fob does not detect the "call" or the RF transceiver does not detect the "reply" then the fob is considered by the system to be "absent" and (if the car is running and in Park) the lockdown mode is initiated. The control module keeps on periodically sending "calls" and the lockdown mode is suspended when the fob "reply" is again detected. If needed, such as for fault tolerance purposes and reliability, the system could be required to have two (or more) consecutive "non-reply" cycles before initiating lockdown. Alternatively, and with a programmed delay in lockdown, any detection of a "reply" from the fob while the timer is counting down to the "lockdown" command could reset the timer and return the system to the standard mode where the fob is being detected. As an option, fobs can be paired and authorized on multiple vehicles, allowing officers access to multiple vehicles without changing fobs. As one option, all officers of a police force or other law enforcement agency could carry a fob recognizable for all vehicles.

Controlling BTSI

The BTSI on many vehicles can be controlled via one or more of the vehicles networks, typically over a CAN network. On vehicles where this is not possible, a hard wired approach can be used, wherein the control module can be wired to the BTSI mechanism to override its normal operation and lock or unlock it.

Preventing Inadvertent Vehicle Lockdown

In the case of the Charger, and other chassis which use a fob, the OEM fob must be present to start the vehicle, and will thus always be detected on engine start. To prevent inadvertent vehicle lockdown when an aftermarket fob is being used on vehicles which do not come from the factory with an OEM fob, the system will not activate and lock the vehicle down if no fob was detected during engine start with a key. In this way, service personnel can operate the vehicle with the key, but without the fob and not have the system lock the vehicle down inadvertently.

As another option, the control module can provide an optional override input which can be connected to a hidden button, should the officer lose the fob while away from the vehicle, it's battery goes dead, or it is otherwise broken or disabled.

A typical CAN vehicle network includes numerous OEM Electronic Control Units (ECU's). These ECU's are embedded computers in the vehicle which control the engine, transmission, lights, HVAC, BTSI, and so on. In most vehicles, one of these ECU's has Radio Frequency ("RF") wireless communication capability, for communicating to a key fob and other wireless devices, such as the tire pressure monitoring system sensors in the wheels.

Connected to this network is the On Board Diagnostic II connector (OBDII) or other On Board Diagnostic (OBD) connector. This connector is used to gain access to the vehicle's networks. It is frequently possible to acquire fob proximity information over this connection, as well as control the vehicle's BTSI. Access to the vehicle networks can also be achieved at various OEM connectors throughout the vehicle's electrical system.

The RF fob could be of the OEM type, communicating to one of the vehicle's RF transceiver ECU's, or could be of the aftermarket type, communicating to the control module. In either case, the proximity (typically within 5 to 10 feet and potentially adjustable by the installer technician as to range) of the fob is determined, the fob authenticated, and used to "lock down" the vehicle when the fob is not detected, and the vehicle is parked and left running. The fob becomes a "body worn" device, staying with or on the driver's person.

Figure 1:
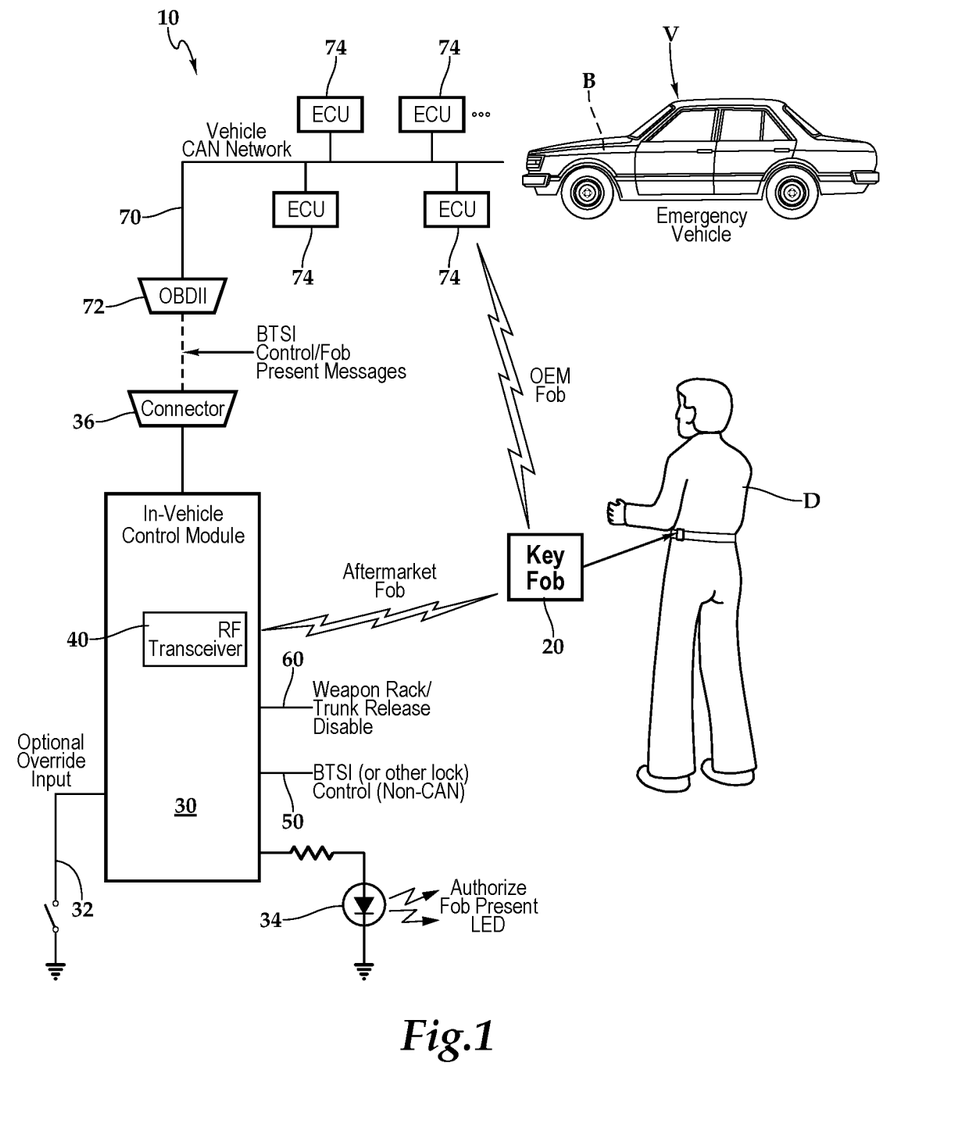
FIG. 1 is a schematic depicting the theft prevention system of this invention according to two different embodiments, including an embodiment where an OEM fob and OEM RF transceiver fob detector ECU associated with a keyless ignition system of the vehicle are utilized and a second embodiment where an aftermarket fob and fob detector are utilized.
Figure 2:
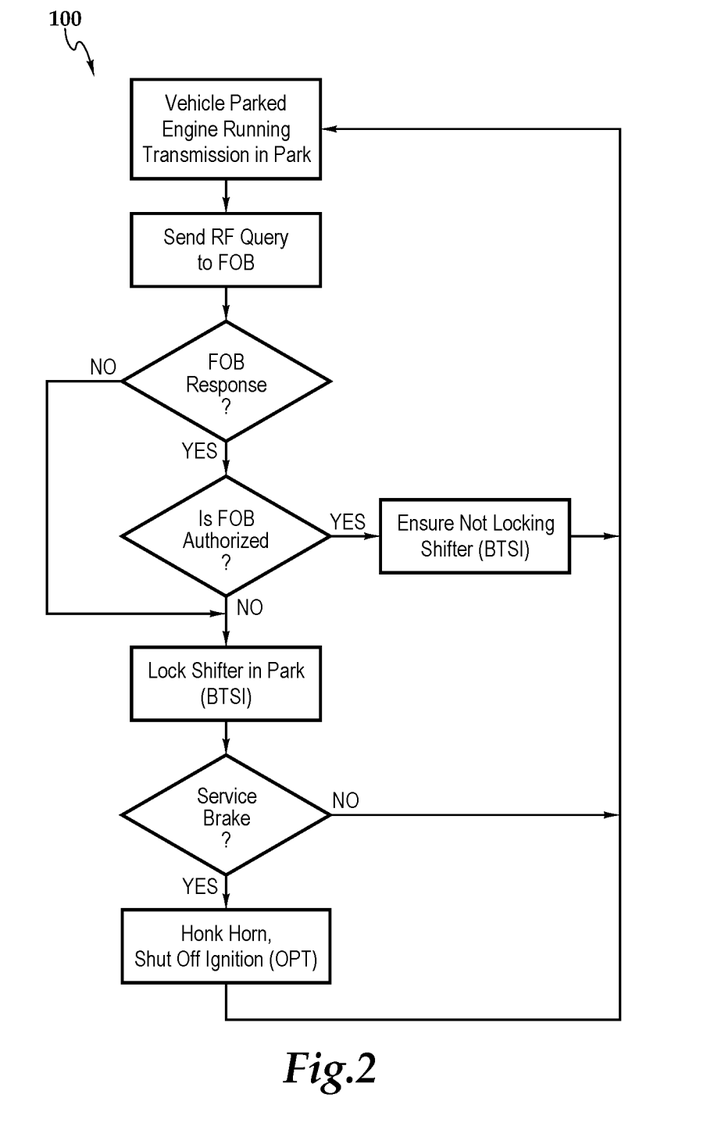
FIG. 2 is a flow chart illustrating operation of the system and method of this invention according to at least one embodiment disclosed herein.
Figure 3:
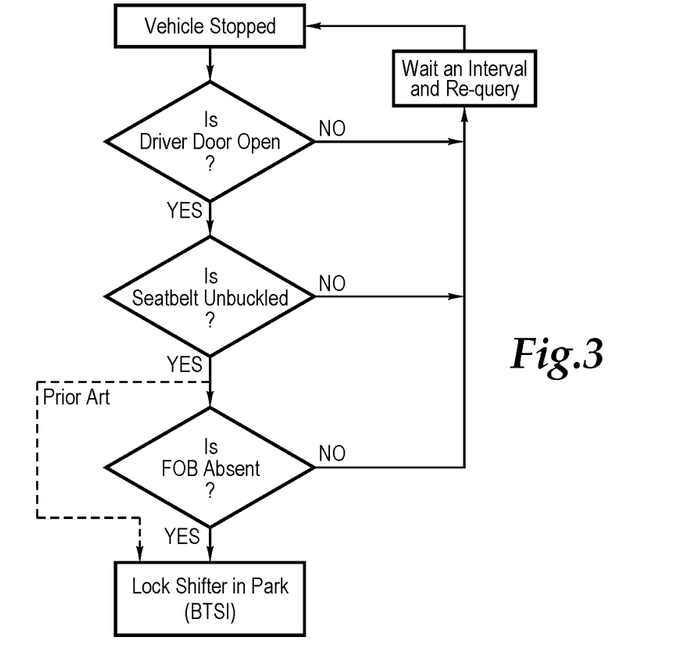
FIG. 3 is a flow chart illustrating operation of the system and method of this invention according to one alternate embodiment to prevent locking of a vehicle transmission automatically if a fob is present near a driver's seat or in the cab of the vehicle.
Figure 4:
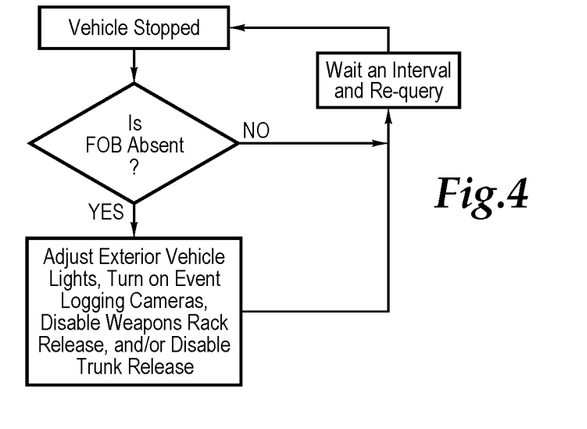
FIG. 4 is a flow chart illustrating operation of the system and method of this invention according to various further embodiments, where fob absence from the driver's seat is used to adjust or disable various vehicle subsystems, especially for police cars and similar law enforcement vehicles.

The control module acquires fob proximity information either over the vehicle's network, or by its own RF communication circuits. In one embodiment, such proximity is established by the control module sending out an RF "call" signal. If the fob is within range it receives the "call" and sends a "reply" RF signal. When the control module detects the "reply" proximity is established. If no "reply" is detected the control module considers the fob to not be proximate and initiates "lockdown." Other RF protocols could be followed or other proximity sensors utilized. The module controls the vehicle's BTSI or other "lock down" system over the vehicle's CAN network, or by activating its discrete output signal. The active indicator LED is also shown in FIG. 1, as well as the optional override input.

A progression of steps followed in the operation of the system of this invention, and according to the method of this invention are described as follows. The lockdown system of this invention typically begins when the vehicle is stationary, the engine is running, and the transmission is in park. RF queries are sent periodically to the fob in the form of a "call." If the fob responds with an RF "reply," the system proceeds to evaluate if the fob is an authorized fob. If no fob is detected (no "reply" is received) or if the fob is not authorized, lockdown mode is initiated and the BTSI keeps the vehicle transmission in park. If the fob is detected and authorized, the system ensures that the BTSI is not locked, but rather is only engaged until the service brake is depressed, as in normal operation of the BTSI.

As an option and further enhancement to the system of this invention, if the system is in "lockdown" mode with the BTSI commanded to remain in an orientation locking the transmission in park, and then service brake depression is detected, rather than disengage the BTSI as would occur in normal operation without "lockdown" mode, the depression of the service brake instead causes some form of an alarm to sound or be otherwise sent. This is because the fob is not detected and yet someone is depressing the service brake, and thus is a potential vehicle thief attempting to shift the transmission out of park. The alarm could be in the form of sounding of the vehicle horn, flashing of lights, sending of emergency signals to a dispatcher over the vehicle radio, or some other alarm or combination of alarms. In one embodiment, horn honking occurs only for a limited time (e.g. 20 seconds) so that inadvertent triggering of the alarm will not cause exceptional nuisance or battery drain. Another option when detecting such a service brake depression while in the lockdown mode would be to shut off the ignition and thus the engine of the vehicle.

In alternate embodiments, presence or absence of an authorized fob within the vehicle is used to interact with other systems of the vehicle. In one such embodiment, this invention provides an aftermarket ECU, which queries the OEM vehicle ECU's over the CAN network to determine active fob presence and prevents FCA vehicles (or potentially other vehicles if similarly configured) from auto shifting into Park if the fob is determined to be present. When the fob (driver) leaves the vehicle, the aftermarket ECU then detects the absence of the fob and allows the OEM system to auto shift the transmission into Park if the conditions to do so are still met. This is highly desirable in the emergency response sectors of Fire and Law Enforcement, as well as others, providing safety when the driver is absent from the driver seat, but lack of interference with car function when the driver is present.

CAN network messaging can be used by the aftermarket ECU to not only determine fob proximity, but also to prevent the vehicle from auto shifting into Park. Note that the safety feature of auto shifting into Park, is still active, this invention just provides the additional condition that the fob must leave the vehicle.

In non-FCA vehicles which do not implement the "auto shift into Park" safety strategy, such an Auto Park system can be implemented along with the added benefit of fob presence detection. This could be done by the vehicle manufacturer or could be done in the aftermarket by using an aftermarket ECU which is able to send commands over the vehicle network, commanding the responsible controller to shift into Park when the conditions are met, that is, when 1) the driver's door is open, and 2) the driver's seatbelt is not fastened, and 3) the vehicle speed is sufficiently slow, and 4) the added condition that the fob is not detected in the vehicle.

The system described above for an intelligent automatic shifting into park when the driver leaves the vehicle is one embodiment of this invention. This invention provides for numerous additional uses of active fob proximity detection beyond the example given above. This invention envisions many uses of auto fob status detection as follows.

Law Enforcement—InterMotive (employer of the inventor's herein) has a product (IdleGuard), covered under another patent application which will automatically lock the transmission shifter in Park (does not shift vehicle into Park) when the fob leaves the vehicle.

Another use is to shut off parts of the roof mounted light bar, to minimize blinding an officer when he exits the vehicle with the lights on.

Another use would be to automatically turn on event logging cameras when the officer leaves the vehicle.

Another use would be to disable the weapons rack release button when the fob leaves the vehicle, preventing unauthorized use of the vehicle's Law Enforcement weapons.

Another use would be to disable the trunk or rear hatch release buttons, preventing unauthorized access to Law Enforcement equipment stowed in the vehicle.

Ambulance—Ambulances are a theft target due to their stocking of expensive controlled substances and prescription drugs. Ambulances are normally left running with the key in the ignition and then locked after pulling up on scene while the EMT's leave the vehicle to pick up a patient. Upon returning, the driver/EMT needs to unlock the vehicle and patient compartment. Frequently the chassis is designed with a 'hidden' unlock button on the vehicle. The presence of the physical button is problematic as an observant thief can spot the button being pushed, and now knows how to easily steal the vehicle the next time he has an opportunity. A much better approach is for the driver/EMT to carry an active RF fob that automatically unlocks the vehicle and patient compartment when the fob is present, by using the fob and fob detector of this invention and integrated into the CAN network of the vehicle. This application may require the installation of a remote fob reader near the rear of the vehicle to allow detection of the fob and subsequent unlocking of the vehicle doors. Most ambulances have aftermarket systems which unlock the patient compartment when the vehicle cabin doors are unlocked.

Automatically unlocking the vehicle doors when the fob is detected can also be applied to unlocking inside cabinets in the patient compartment, providing access as needed.

Ambulances based on FCA chassis such as RAM trucks and vans can benefit from the previously described intelligent auto shift into Park feature with active fob detection.

Work Truck Applications—Driver fob detection might be used to control emergency lighting, or other truck equipment, preventing its use by unauthorized personnel. Auto unlocking tool cabinets and other equipment is another possibility.

Recreational Vehicle Applications—Active fob detection can be used to not only prevent vehicle theft, but to also prevent unauthorized use of pop outs, gen/sets, battery backup systems, and various other systems.

All Vehicle Types—A fob can come in different forms. One incarnation consists of a driver's ID card, which contains the electronics to implement Near Field Communications (NFC) like that of a passive vehicle fob. Other devices containing these NFC electronics are all thus considered to be fobs according to this invention.

An aftermarket tablet which can read the driver's ID card (or other fob) using NFC can be used to detect the presence of an authorized driver, communicate this to an aftermarket ECU which is controlling the OEM BTSI, thus locking the shifter unless an authorized driver ID card is presented to the tablet, at which time the BTSI is unlocked, allowing the vehicle to be shifted out of Park and driven. This can be used on all vehicle types, and acts as a form of theft deterrent.

Fob detection can be used for reporting driver in/out of the vehicle status to telematics system, thus providing this information to central dispatch locations.

Providing fob location status to other vehicle systems, would allow Boolean logic functions to be created based on various vehicle parameters and discrete inputs. Such "and" "or" (or other Boolean) equations can be used to activate outputs connected to various pieces of equipment based on fob presence. Equipment could be enabled only when the driver is present, along with other required preconditions.

This invention is useable on all vehicles. For the purpose this discussion, vehicles can be broken down into two classes: those which already include an active RF type of fob, whose proximity can be detected by the vehicle electronics, and those which do not. Vehicles which come from the factory with this active fob capability are generally characterized by an Engine Start/Stop button. Those which do not have this type of system can have an active RF fob and reader added as an aftermarket system, and enjoy the benefits described in this invention.

All fobs have a unique identification code (ID) which they communicate wirelessly to the receiving Electronic Control Unit (ECU or RF transceiver) in the vehicle. If a vehicle does not come from the factory with an active RF fob and reader, they can be added as aftermarket devices. The fobs are paired to the fob reader, such that the ID's are recognized and accepted as authorized by the reader. The pairing allows the control module to identify authorized fobs. The RF fob can use any of several available wireless RF technologies so its ID and presence can be detected by the control module. Active RFID is one such technology choice, providing appropriate range. The OEM fob reader or transceiver is usually connected to one or more of the vehicle's CAN networks, or other vehicle networks, allowing it to communicate with other ECU's in the vehicle. The status of fob location can thus typically be read over one or more of the vehicle's networks (e.g. OBD II).

The aftermarket control module provides an output signal which can be connected to an indicator such as an LED, to let the driver know the fob is detected as an authorized fob for this vehicle (or analogously that the fob is detected but not authorized or that no fob is detected), such as with different color LEDs. To detect fob presence, in one embodiment, the RF transceiver control module sends out an RF signal periodically (e.g. once every second). The fob will detect the RF signal "query" and return an RF signal "reply" that the control module detects. Presence of the fob is thus confirmed. If the fob does not detect the "query" or the control module does not detect the "reply" then the fob is considered by the system to be "absent." As an option, fobs can be paired and authorized on multiple vehicles, allowing operators access to multiple vehicles without changing fobs. As one option, all operators of a fleet could carry a fob recognizable for all vehicles.

FIG. 1 shows a typical CAN vehicle network with various Electronic Control Units (ECU's). These ECU's are embedded computers in the vehicle which control the engine, transmission, lights, HVAC and so on. In most vehicles, one of these ECU's has Radio Frequency (RF) wireless transceiver communication capability, for communicating to a key fob and other wireless devices, such as the tire pressure monitoring system sensors in the wheels.

Connected to this network is the On Board Diagnostic II connector (OBDII). This connector is one possible way to gain access to the vehicle's networks. Other connectors on the CAN network are available as well. FIG. 1 shows the control module of this invention connected to the OBDII. It is frequently possible to acquire fob proximity information from the OEM RF transceiver over this connection.

The RF fob shown in FIG. 1 could be of the OEM type, communicating to one of the vehicle's ECU's, or could be of the aftermarket type, communicating to the aftermarket control module. In either case, the proximity (typically a meter or two and potentially adjustable by the installer technician as to range) of the fob is determined, and the fob authenticated. The fob becomes a "body worn" device, staying with or on the driver's person.

The aftermarket in-vehicle control module acquires fob proximity information either over the vehicle's network, or by its own RF communication circuits. In one embodiment, such proximity is established by the control module sending out an RF "query" signal. If the fob is within range it receives the "query" and sends a "reply" RF signal. When the control module detects the "reply" from an authorized fob, proximity is established. If no "reply" is detected the control module considers the fob to not be proximate, and acts accordingly. Other RF protocols could be followed or other proximity sensors utilized.

OBJECTS OF THE INVENTION

Accordingly, a primary object of the present invention, according to at least one embodiment, is to prevent theft of a vehicle by utilizing an existing vehicle disabler system, such as a BTSI, on a vehicle and preventing disengagement of the vehicle disabler if a mobile fob carried by an authorized driver of the vehicle is not present adjacent to a fob detector on the vehicle.

Another object of the present invention is to provide a system for preventing theft of emergency vehicles.

Another object of the present invention is to provide a method for disabling a vehicle and keeping a vehicle disabled if presence of a fob carried by an authorized user of the vehicle is not present.

Another object of the present invention is to provide a vehicle disabler which keeps the vehicle disabled when presence of a fob carried by an authorized user is not present, using either a fob associated with a keyless ignition of the vehicle or a fob provided separate from a mechanical key ignition of the vehicle.

Another object of the present invention is to disable not only the vehicle, but also release of a weapon rack, trunk and/or other subsystems of the vehicle when presence of a fob carried by an authorized driver of the vehicle is not present.

Another object of the present invention is to provide a theft prevention system for an emergency vehicle which automatically engages when an authorized driver of the vehicle exits the vehicle, and automatically is disabled to allow vehicle operation when the authorized driver returns to the vehicle.

Another object of the present invention is to provide a vehicle disabler which can be overridden and allow vehicle operation by toggling an override switch, such as to allow maintenance personnel to operate the vehicle without an authorized driver fob being present, or in instances where the authorized driver fob becomes inoperable.

Another object of the present invention is to provide a fob detector inside the cabin of the vehicle and to keep an automatic parking brake from engaging if the fob detector detects an authorized fob inside the vehicle.

Another object of the present invention is to provide a fob detector which causes vehicle systems to adjust their performance and/or status/condition/state if an authorized fob is not detected inside of the vehicle.

Another object of the present invention is to provide a method for improving performance of vehicle systems by factoring into the operation (or inoperation) whether or not a fob is present inside the vehicle.

Another object of the present invention is to provide a system for improving vehicle subsystem performance including a fob detector near the driver's seat and controlling subsystem performance to optimize performance response to whether or not a fob is detected by the fob detector.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 is directed to a theft prevention system (FIG. 1) which can be integrated into various different subsystems of a vehicle V, and especially an emergency vehicle V, to assist in prevention of theft thereof or other unauthorized operation thereof. The system 10 includes two main variations both illustrated in FIG. 1. In a first embodiment, the vehicle has a keyless ignition system including a fob detector and a fob 20, and with the ignition requiring presence of the fob 20 in the cabin of the vehicle for ignition and vehicle V operation. In a second embodiment, the ignition system is a mechanical key ignition system and a fob 20 and fob detector 40 are provided separate from the ignition system of the vehicle V to operate the system 10 of this invention. In further embodiments, other subsystems of the vehicle V can also optionally be disabled or otherwise controlled to both further deter theft, and to otherwise provide beneficial enhanced safety and optimal utilization of subsystems of the vehicle V.

In essence, and with particular reference to FIG. 1, basic details of the system of this invention are described, according to these two exemplary embodiments. The system 10 includes a fob 20 which can be an OEM fob associated with a keyless ignition of the vehicle V, or can be an aftermarket fob 20 provided as part of the system 10 of this invention, integrated into the vehicle V (either in originally configuring the vehicle V, or by retrofitting onto the vehicle V). A control module 30 provides a preferred form of controller integrated into the vehicle V as part of the system 10. This control module 30 includes an RF transceiver 40 (or other fob detector) as part of the control module 30, with the RF transceiver 40 configured to detect the aftermarket fob 20. If the fob 20 is an OEM fob 20, the control module 30 typically does not include the RF transceiver 40, but rather accesses a fob detector (such as an RF transceiver) associated with the keyless ignition of the vehicle V, such as by communicating with the controller area network (CAN) 70 of the vehicle V, and various electronic control units (ECUs) on the CAN 70, such as an ECU 74 configured as the fob detector of a keyless ignition system.

In at least one embodiment, the control module 30 also connects to a brake transmission shift interlock (BTSI) B of the vehicle V (or other vehicle disabler), either through a BTSI B lock control line 50 leading from the control module 30 to the BTSI B, or through the CAN 70, to access the BTSI which is also typically coupled to the CAN through a body control module (BCM) which functions as an ECU. The controller module 30 is also coupled to an auxiliary release disabler 60, either through the CAN 70 or otherwise through a separate control signal line, for control of and disabling of auxiliary elements of the vehicle, such as a weapon rack release or a trunk release.

More specifically, and with continuing reference to FIG. 1, details of the fob 20 are described, according to at least one embodiment of this invention. The fob 20 is a mobile device which in many ways replaces the function of a mechanical key, especially for vehicles which have a keyless ignition system. This mobile fob is typically carried by an authorized driver of the vehicle. For instance, this fob can be carried in a pocket of the authorized driver. As another option, the fob can be secured to or integrated into a utility belt of the authorized driver/operator of the vehicle.

The fob in a preferred embodiment utilizes radio frequency (RF) technology to communicate with a fob detector 40. In one embodiment, the fob detector 40 is an RF transceiver associated with the control module 30 provided by the system of this invention. In at least one embodiment, the fob detector 74 is alternatively part of the keyless ignition system of the vehicle V, and the control module 30 is coupled to the fob detector 74 through the CAN 70 of the vehicle V (but could alternatively be directly wired to or wirelessly communicate with the fob detector, either directly or through a separate interface).

In one embodiment, the fob detector 40 is an active RFID (radio frequency identification) type device and the fob 20 has appropriate circuitry so that when queried by a "call" from the fob detector 40, generates an appropriate "reply" RF signal from the fob 20 which can be detected by the fob detector 40 and represents that the fob 20 is present, sufficiently close to the fob detector that this reply from the fob 20 can be sensed by the fob detector 40. Furthermore, the fob 20 is typically encoded with a unique identifier, so that the fob detector 40 can recognize the identity of the fob 20 and verify that the fob 20 is the correct fob 20, before allowing vehicle ignition or other steps to be performed.

In some instances, RFID is not entirely "passive" with no power associated with the fob 20, but rather is "active" with power supplied to the fob 20 to boost the amplitude/intensity of the reply from the fob 20 and to allow detection of the fob 20 when it is a greater distance away from the fob detector 40. Both active and passive RFID type fobs 20 are contemplated according to this invention, with active RFID fobs 20 allowing identification of the fob 20 from a greater distance from the fob detector 40. In a preferred embodiment, a vehicle with an OEM active RFID fob is provided containing a battery. This allows detection by the detector 74 up to a distance of a meter or so, but when this fob leaves the vehicle, it can no longer be detected. This active RFID embodiment does not require aftermarket RF transceiver 40, but relies on the detector 74. In other embodiments the active RFID fob detector 74 (or 40) could be boosted to have a greater range, such as to include an area outside of the vehicle (such as adjacent to a trunk or a rear of a fire fighting vehicle).

An alternative to active RFID is passive RFID, where the fob has no battery, and no ability to transmit or communicate with the detector 40 (or 74) other than at very close range, an inch or two. This is typically called Near Field Communication (NFC). Some vehicles use near field fobs (for instance Dodge RAM trucks) which plug into an "ignition switch" similar to a metal key. There is a coil "antenna" around the switch which "reads" the near field fob, which is still typically referred to as "RF." These ignition switches typically lock the fob in place so it can't be removed until the engine is shut off. Typically all "smart" metal keys of the last ten years have an embedded chip and use this same near field technology. The technology of this invention can be implemented with near field communication or longer range (typically active RFID) RF transceivers.

Vehicles not having an active RFID system or other battery powered RF fob, such as those with mechanical keys, or passive near field RFID, will typically be outfitted with the fob detector 40 and aftermarket key fob 20 to provide the necessary "fob leaving the vehicle" detection.

Even with such an active RFID fob 20, this fob 20 could still be tuned in one embodiment of this invention, such as with an adjustable sensitivity input, so that a user can optimize the sensitivity of the system 10, by increasing the amplitude/intensity of the reply from the fob 20 or adjusting the receiving sensitivity of the fob detector 40 to match desired range for the fob 20 to be detected. For instance, if the vehicle is a firetruck and it is desirable that the equipment at a rear end of the firetruck be disabled and locked, unless presence of the fob 20 is detected, due to the greater distance involved, sensitivity of the system 10, and amplitude/intensity of the reply from the fob 20 could be increased to ensure proper operation in such circumstances. Another embodiment could include a secondary RF transceiver located on the rear of the vehicle for detecting fobs in that localized region.

Furthermore, if desired, the fob could have a "boost" button thereon which could be depressed by a user to boost an amplitude/intensity of the reply signal from the fob 20 when an authorized user having the fob is a relatively far distance from the vehicle V, but desires to have the fob detector 40 detect presence of the fob 20, so that theft prevention disabling subsystems are disengaged, to allow vehicle subsystems to be accessed. As an example, a user of a police emergency vehicle with a fob 20 having a relatively short range in typical use, could cause the fob 20 to emit a stronger reply signal to be detected by the fob detector 40 when the authorized individual is at a rear of the vehicle near the trunk of the vehicle V, by pushing the boost button on the fob 20. Such a boost could function by increasing the power supplied to the antenna, so that the transmitted signal from the antenna is boosted for the period that the button is depressed.

While the fob 20 described above is considered to use RF technology, and particularly RFID technology, other RF technology could alternatively be utilized, or frequencies other than radio frequency could be utilized, but still with electro-magnetic waves interacting between the fob 20 and the fob detector 40. In other embodiments, other transmission technology including sound waves or other signaling technologies of a wireless nature could be utilized between the fob 20 and the fob detector 40 in variations of this invention.

The control module 30 provides a preferred form of controller for implementing the system 10 of this invention. In a typical embodiment, such as that disclosed in FIG. 1, the control module 30 is connected to a controller area network (CAN) 70 of the vehicle V. Typically, the CAN 70 includes an on-board diagnostic port 72 which allows for separate devices to be plugged into the CAN 70 of the vehicle V. The control module 30 includes a connector 36 thereon which attaches to the onboard diagnostic port 72 to allow for the control module 30 or other controller to interface with the CAN 70. As an alternative, the control module 30 could be plugged into other locations on the CAN bus 70, or wired (or wirelessly) connected to appropriate associated elements and subsystems of the vehicle V to implement the system 10 of this invention, such as being coupled to a fob detector associated with a keyless ignition system of the vehicle V, and/or coupling to the brake transmission shift interlock (BTSI) B (and/or a transmission shift interlock (TSI) along with an air brake or electric parking brake) of the vehicle V and/or coupling to a door ajar sensor and/or coupling to a seatbelt status sensor (or other elements or subsystems, such as a trunk release system, a weapons rack release system, and an exterior vehicle lighting system).

The control module 30 can include an onboard power source or can draw power from the vehicle to which it is coupled through the connector 36, or other sources of vehicle power. If the control module 30 is to be used with an aftermarket fob 20, the control module 30 typically includes the RF transceiver 40 or other fob detector thereon. Alternatively, the control module 30 could access the RF transceiver or other fob detector of a keyless ignition system through the CAN 70, or through a separate wired or wireless interface with the RF transceiver 40 or other OEM fob detector.

The control module 30 includes programming thereon to cause the control module 30 to implement the system of this invention according to desired parameters. This programming within the control module could be "firmware" integrated into electronics or otherwise built into the control module 30, so the control module 30 is effectively pre-programmed and not adjustable (or only adjustable within certain limited parameters). As an alternative, the control module 30 can be programmable, such as by including one or more programmable logic devices thereon which can be appropriately programmed either before or after coupling of the control module 30 to the CAN 70, or otherwise integrated into the vehicle V.

The programming of the control module 30, regardless of how it is provided, implements the systems and methods of this invention, according to the various embodiments disclosed herein. For instance, such programming can set initial status parameters. Sensors can be queried following a programmed sequence or at programmed intervals. If sensors detect vehicle elements to match a state of interest, some response is produced, in the form of an output signal from the control module 30 to other ECUs or other elements to implement the systems/methods of this invention. For instance, the programming can cause a safety subroutine to be followed whenever the vehicle is stopped (or traveling below a preset speed (e.g. 2 miles per hour), involving querying the seatbelt sensor and the door ajar sensor and the fob presence detector, if these sensors all show a potential "driver away" status (door is ajar and seatbelt is unbuckled and fob is absent), then the vehicle can be caused to automatically shift into "Park" (and/or the BTSI B could be activated). At a preset interval, such as every second, the programming could re-run to determine if shifting to park is warranted. For other systems, corresponding programming would be similarly implemented.

The control module optionally but preferably has a variety of subsystems associated therewith to implement the system 10 of this invention according to various different embodiments and permutations thereof. One such subsystem is an override switch 32 associated with the control module 30. This override switch 32 could be a manually toggleable switch between an operating position and a disabled position. As an alternative, this override switch 32 could be wirelessly accessed through some remote control device, to allow for disabling of the control module 30. Such an override switch 32 for the control module 30 can cause the control module 30 to be disabled when desired. When the control module 30 is disabled, various systems of the vehicle V continue to operate in the manner for which they are designed, and without the theft prevention system 10 of this invention being operable.

In the case of an aftermarket fob 20 ad RF transceiver 40, an override switch 32 can allow maintenance personnel or other authorized personnel, who do not have access to the fob 20, to operate the vehicle V and subsystems of the vehicle V, without being blocked by operation of the system 10 of this invention. Such an override switch 32, if a manually toggleable switch, would typically be hidden so that it would not be easily findable by a thief or other unauthorized personnel. Options could be provided for placement of such an override switch 32 in a variety of different locations to further thwart unauthorized utilization of the override switch 32 to defeat the system 10 of this invention, for theft or improper use of the vehicle V. The override switch 32 is sensed by the in-vehicle control module 30 which merely disables its normal operation. In the event that the fob 20 is damaged or the battery goes dead while it is outside of the vehicle and the system is active, the user can deactivate the BTSI lock down by shutting off the vehicle and restarting it. Active RFID fobs are designed to also function in close proximity near field mode by using them to push the vehicle's stop/start button, establishing near field battery-less operation.

Other optional subsystems on the control module 30 include a BTSI lock 50 separate from the CAN 70. Some vehicles V may have a CAN 70 which is not coupled to the BTSI B. In which case, the BTSI lock control line 50 can be routed to the BTSI B, so that the control module 30 can appropriately disable the BTSI B and keep the vehicle from shifting out of park, such as when presence of the fob 20 is not detected by the fob detector 40.

This control line 50 can furthermore be utilized on vehicles which do not have a BTSI B associated therewith, or if vehicle disabling subsystems other than a BTSI B, or in addition to the BTSI B, are desired to also be utilized by the control module 30 to disable the vehicle most effectively, such as when presence of the fob 20 is not detected by the fob detector 40. Such alternative vehicle disabler subsystems can include transmission shift inhibitor (TSI) systems which are not related to the service brake, but prevent shifting of the transmission of the vehicle, air brakes of the vehicle, and parking brakes of the vehicle, either electric parking brakes or otherwise. Such a control line 50 can provide the same benefit for the system 10 of this invention as when the control module 30 controls the BTSI B, such as through the CAN 70, by causing the vehicle disabler to remain in a mode disabling the vehicle V, and be prevented from disengagement when the control module 30 or other controller fails to detect the presence of the fob 20 proximate to the fob detector 40.

The control module 30 can be coupled to a horn of the vehicle V or other alarm system of the vehicle V with an audible alarm signal, which can, through the controller, cause the horn to sound when a service brake of the vehicle V is depressed, but the fob 20 is not detected by the fob detector 40. Such a subsystem would have a high likelihood of signaling to nearby personnel that a thief or other unauthorized individual is about to steal the vehicle V. The service brake is being depressed, but the fob 20 is not in proximity to the fob detector 40. By sounding the horn, adjacent authorized personnel can be alerted to this potential theft to take appropriate action. In addition to or as an alternative to sounding the horn, communication systems associated with the vehicle V (e.g. flashing lights or radio calls) could alert other authorized personnel that a vehicle is about to be potentially stolen or used in an unauthorized fashion.

The control module 30, in one embodiment, includes LED lights 34 (or other lights) on a housing thereof which can be viewed by maintenance personnel and/or authorized users of the system 10. In one embodiment, at least one LED light 34 is thereon which is illuminated when the fob 20 is detected by the fob detector 40 as being present. Such a light is useful in detecting whether the system 10 is operating appropriately. A second light could be provided which indicates that a fob 20 is detected, but that the fob 20 that is detected does not have the correct "ID" for the vehicle V. Such lights could assist in fleet operators configuring a fleet of vehicles to be easily programmed or otherwise modified and/or set up to work with the correct authorized driver's and other users of vehicles within the fleet.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. Systems according to this invention could function based on detection of both fob presence and fob absence. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for improving an auto park feature of a vehicle which automatically puts the vehicle into "Park" when various criteria are met, comprising in combination:
   an automatic transmission shifting actuator;
   a door ajar sensor;
   a seatbelt sensor;
   a fob detector;
   said actuator shifting the vehicle transmission into "Park" when the transmission is not already in "Park" and said door ajar sensor detects that a door is ajar and said seatbelt sensor detects that a seatbelt is unbuckled, and said fob detector does not detect an authorized fob.

2. The system of claim 1 wherein said fob detector is located adjacent to a driver's seat of the vehicle to detect said authorized fob if it is carried by a person sitting on the driver's seat.

3. The system of claim 2 wherein said fob detector is located less than five to ten feet from the driver's seat.

4. The system of claim 2 wherein said fob detector is sensitivity adjustable to select a proximity range from said fob detector within which said authorized fob is adjacent to the driver's seat and/or said fob detector.

5. The system of claim 1 wherein said authorized fob and said fob detector are original equipment within the vehicle and the automatic transmission shifting actuator is original equipment within the vehicle, modified to query said existing fob detector for presence of said authorized fob before putting the vehicle into "Park".

6. The system of claim 1 wherein said authorized fob and said fob detector are configured to communicate with an in-vehicle control module coupled to a CAN network of the vehicle, and wherein said automatic transmission shifting actuator is a BTSI.

7. A method for preventing an autoshift lock system of a vehicle transmission from being engaged, the autoshift lock system including an automatic transmission shift actuator, a door ajar sensor and a seatbelt sensor, and which uses the automatic transmission shift actuator to shift the vehicle transmission into "Park" when the transmission is not in "Park" and the door ajar sensor senses that the door is ajar and the seatbelt sensor senses that the seatbelt is unbuckled, the method including the steps of:
   querying a fob detector to determine if a fob is in a cabin of the vehicle or adjacent to a driver's seat of the vehicle; and
   preventing the autoshift lock system from working when the fob detector detects presence of the fob.

8. The method of claim 7 including the further step of locating the fob detector close enough to the driver's seat to detect fob presence when the fob is carried by a person sitting on the driver's seat.

9. The method of claim 8 including the further step of adjusting fob position to adjust sensitivity of the fob detector to detecting presence of the fob detector adjacent to the driver's seat.

10. The method of claim 7 including the further step of adjusting fob detector sensitivity.

11. The method of claim 7 wherein said querying step includes using a common fob detector both for said querying step and to perform at least one other vehicle control function, such that the same fob detector is used for multiple purposes.

12. The method of claim 7 wherein the fob is an active RFID fob.

13. The method of claim 7 wherein the fob is a vehicle ignition control fob.

14. The method of claim 7 wherein the fob is carried by an authorized driver of the vehicle.

\* \* \* \* \*